No. 854,122. PATENTED MAY 21, 1907.
S. B. STORER.
SYSTEM OF ELECTRICAL DISTRIBUTION.
APPLICATION FILED AUG. 10, 1905.
3 SHEETS—SHEET 1.
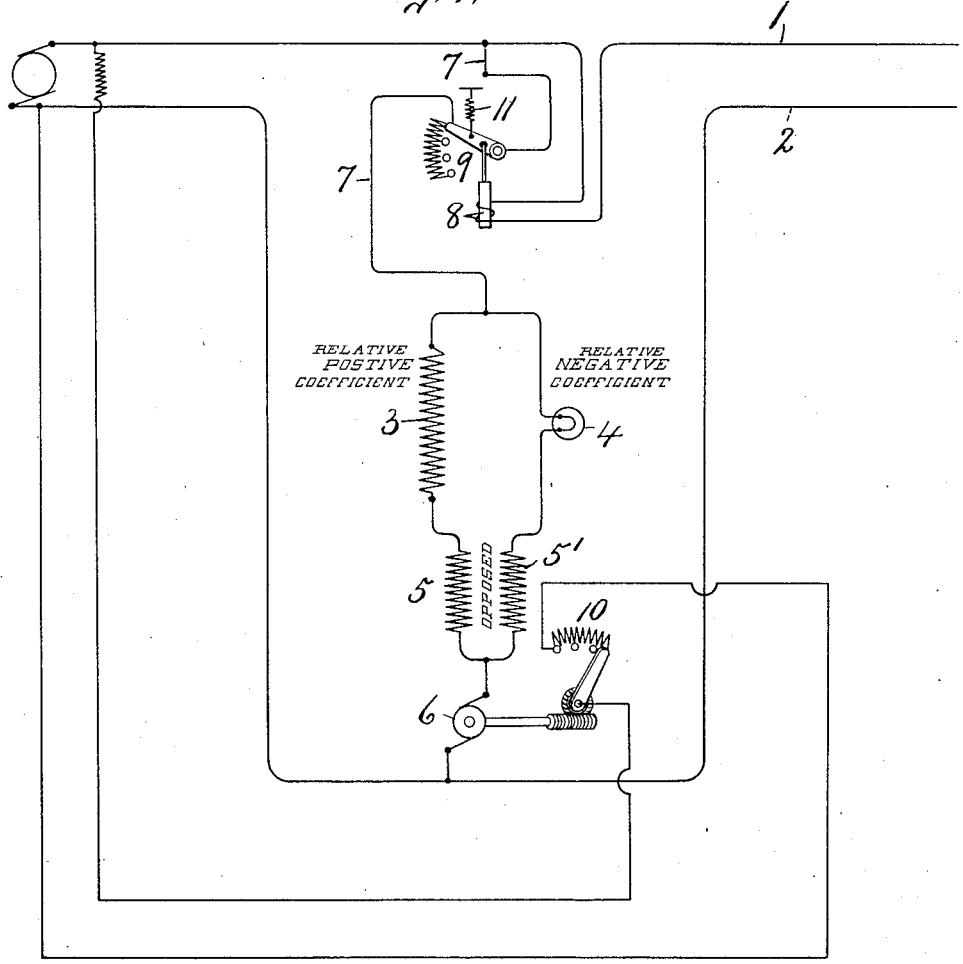
WITNESSES
INVENTOR
Simon B. Storer
BY
Howard P. Denison
ATTORNEY.

No. 854,122. PATENTED MAY 21, 1907.
S. B. STORER.
SYSTEM OF ELECTRICAL DISTRIBUTION.
APPLICATION FILED AUG. 10, 1905.
3 SHEETS—SHEET 2.
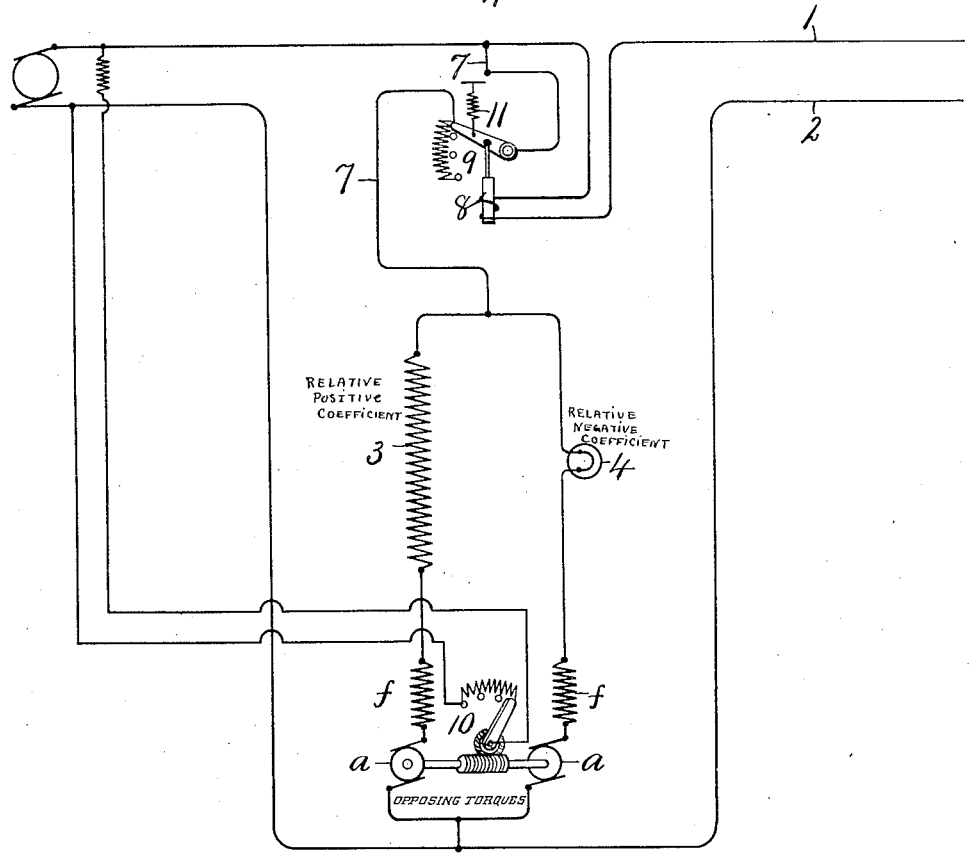
WITNESSES
INVENTOR
Simon B. Storer,
BY
Howard P. Denison
ATTORNEY.

No. 854,122. PATENTED MAY 21, 1907.
S. B. STORER.
SYSTEM OF ELECTRICAL DISTRIBUTION.
APPLICATION FILED AUG. 10, 1905.
3 SHEETS—SHEET 3.
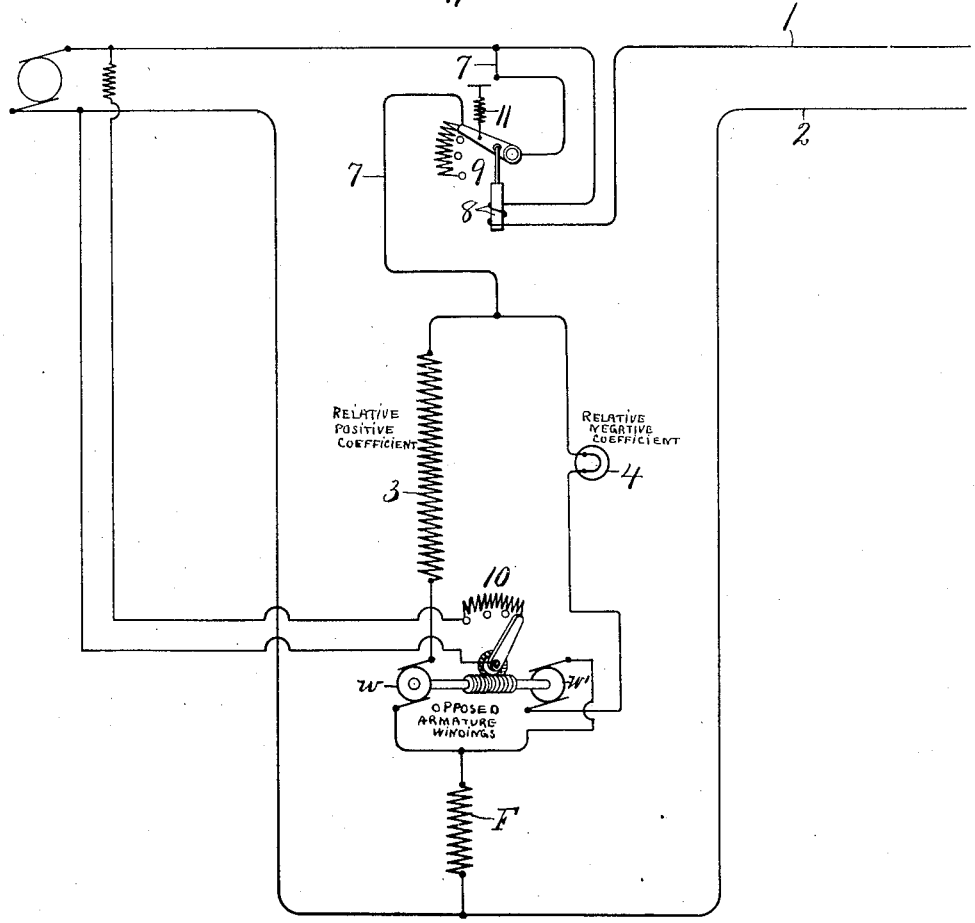
WITNESSES
INVENTOR
Simon B. Storer
BY
Howard P. Denison
ATTORNEY.

UNITED STATES PATENT OFFICE.

SIMON B. STORER, OF SYRACUSE, NEW YORK.

SYSTEM OF ELECTRICAL DISTRIBUTION.

No. 854,122.	Specification of Letters Patent.	Patented May 21, 1907.

Application filed August 10, 1905. Serial No. 273,642.

*To all whom it may concern:*

Be it known that I, SIMON B. STORER, of Syracuse, in the county of Onondaga, in the State of New York, have invented new and useful Improvements in Systems of Electrical Distribution, of which the following, taken in connection with the accompanying drawings, is a full, clear, and exact description.

This invention relates to improvements in electric current regulators, similar to that set forth in my copending application No. 273,641, filed August 10, 1905; the essential object of which is to automatically maintain an approximately definite or predetermined voltage or current at any point or points in a system of electrical distribution, such for instance, as a lighting or power circuit.

In my application above referred to, the current or voltage regulator involves the use of a specially designed Wheatstone bridge and an electric motor having one of its parts, as the field or armature winding in series with the bridge, and the other part, as the armature or field winding, forming a cross connection between the normally neutral-points of the bridge, whereby any fluctuations above or below a normal or predetermined voltage or current, under which the bridge is balanced, actuates the motor in one direction or the other for the purpose of operating any suitable form of voltage or current-regulating device or devices to maintain a substantially constant voltage or current at some point or points in the system.

My present application is for the same purpose and differs only in the substitution of a modified form of electric device whereby the electric motor is brought into action by fluctuations above or below a normal or predetermined voltage or current through thermal changes in the resistance employed.

The essential purpose of my invention is to adapt the device for use in connection with a differential-wound electric motor by connecting the normally balanced and opposed field or armature-windings of the motor in series with separate resistances having such individual and relative electrical characteristics, that when an electric or magnetic balance is established in the motor under a normal or predetermined voltage or current, fluctuations above or below such normal voltage or current will destroy the balance in the field, or armature-windings, thereby causing the motor to operate in one direction or the other until the current or voltage again reaches its normal value.

In the drawings, Figures 1 and 2 are diagrammatic views of different forms of my invention, Fig. 3 is a diagrammatic view similar to Figs. 1 and 2, showing the motor as provided with opposed armature windings, Fig. 1 showing a portion of the main circuit, as —1— and —2—, of an electric distributing system in which my improved current regulating devices are connected for automatic action and consist essentially of unlike resistances —3— and —4— having certain individual and relative electrical characteristics, whereby when an electrical or magnetic balance is established under a normal or predetermined voltage or current, fluctuations above or below such predetermined voltage or current will cause the current through the differential motor windings, as —5— and —5'—, each of which is connected in series with one of the resistances —3— and —4—, to increase or decrease by different percentages, thereby destroying the balanced condition of the field causing the armature, as —6—, of the motor to revolve, it being connected in series with its differential windings, and, therefore, in series with the resistances —3— and —4— until the voltage or current is again normal and the fields consequently balanced. These resistances derive current from the main circuit through an electrical connection —7— leading from the main feed-wire —1—, which includes therein the winding of a solenoid —8— for operating a rheostat —9—, the latter forming a part of the connection —7— between the feed-wire —1— and resistances —3— and —4—, for a purpose hereinafter described.

The electric motor, and particularly the shaft of its armature —6— is connected to and serves to operate a rheostat —10— or other suitable regulating device, whereby more or less resistance or voltage may be automatically introduced into the circuit to be regulated for the purpose of maintaining a substantially constant voltage or current.

As previously stated, the resistances —3— and —4— differ in their electrical characteristics in that one is made of a material, the resistance of which varies directly with its thermal changes, while the resistance of the other varies inversely with its thermal changes, and therefore, one of them, as —3—, which may be made of iron, has a relative positive, and the other one, as carbon, has a relative negative temperature co-efficient. It will now be seen that the rise and fall of the voltage or current in the circuit —1— and —2— above or below the predetermined value under which these resistances give a balanced condition in the motor fields, causes corresponding rise or fall of the temperatures of the resistances —3— and —4—.

Now, assuming that the normal or predetermined voltage or current in the resistances —3— and —4— is such as to establish an electrical balance therein, any increase in the current in the parts —3— and —4— will cause a rise of temperature therein, thereby increasing the resistance in the part —3— and diminishing the resistance in the part —4—. Under such conditions it is evident that there will be a greater increase in current through the resistance —4— and the field coil —5—, than through the resistance —3— and the field —5— and that the difference between the two values of current will unbalance the motor field which will actuate the armature in one direction and thus operate the voltage regulator —10— to cut in or out more or less resistance or voltage in the main circuit at the desired point or points until the voltage or current has again reached its normal value and the resistances —3— and —4— are, therefore, again of such value as to restore the balance in the field of the motor. On the other hand, should the voltage in the circuit —1— and —2— fall below normal then the temperatures in the resistances —3— and —4— would also fall, thereby lowering the electrical resistance in the part —3— and at the same time increasing the resistance in the part —4— so that there would be a smaller decrease in the current in the part —3— and the field-coil —5— than in the part —4— and the field-coil 5′, and the difference between the two values of current would unbalance the field, causing the armature to revolve, but in the opposite direction to that above described, and thereby reverse the action of the regulator —10— to again restore the main circuit to normal conditions, thus re-establishing normal resistance in the parts —3— and —4—, and therefore, a balance in the field-coils —5— and —5′. These operations are repeated automatically as often as the current or voltage in the main circuit fluctuates above or below a normal or predetermined value, and owing to the extreme sensitiveness and delicacy of the operation of the resistances connected and having such relative electrical characteristics as have been described, it is obvious that the current or voltage at any point or points in the main circuit may be held very closely to such normal or predetermined value with but slight fluctuations.

The device may assume several different forms, as, for example, each resistance —3— and —4— may be put in series with the field, as —f—, and armature, as —a—, of a motor, two motors mechanically connected together being used as shown in Fig. 2, and so arranged that their torques oppose each other and are equal and balanced at the predetermined voltage or current. This is virtually the same in effect, as the use of a differential wound motor.

In Fig. 3, I have shown the armature of the motor as provided with differential or opposed windings —w— and —w′— and one of its fields as —F— connected in series with the armature windings. Otherwise this device is substantially the same as that shown in Figs. 1 and 2.

In connection with the device just described, it may be desirable to maintain a constant voltage in the circuit at some distance from the dynamo or other generator, or from the regulator, and I, therefore, electrically connect a variable resistance device, as the rheostat —9— in series with and between the resistances —3— and —4— and main-feed-wire —1—, and also electrically connect the winding of the solenoid —8— in the same circuit with its movable plunger mechanically connected in any suitable manner to the movable member of the rheostat so that any current in the main circuit energizing the solenoid operates to cut in more or less resistance in the circuit through the resistances —3— and —4—, whereby the drop in the voltage through such resistance of the rheostat —9— would be the same, or practically the same as the drop in the main circuit to the point at which the constant voltage is to be maintained, the movable member of the rheostat —9— being returned to its off-position by a spring —11— when no current is flowing in the main circuit.

What I claim is:

1. A device for operating electric regulators including therein resistances having different temperature-co-efficients, and motor-windings connected in series with said resistances.

2. A device for operating electric regulators including therein resistances having different temperature co-efficients, and motor-field-windings connected in series with said resistances.

3. A device for operating electric regulators including therein resistances having different temperature co-efficients, in combination with a motor having approximately half of one of its windings electrically connected in series with each of said resistances.

4. A device for operating electric regulators including therein resistances having different temperature co-efficients, in combination with a motor having approximately half of its windings electrically connected in series with each of said resistances, one-half of such winding acting in opposition to the other half.

5. A device for operating electric regulators including therein resistances having different temperature co-efficients, in combination with a motor having approximately half of its field winding electrically connected in series with each resistance, each half of the field winding acting in opposition to the other half.

In witness whereof I have hereunto set my hand this 5th day of August 1905.

SIMON B. STORER.

Witnesses:
H. E. CHASE,
M. M. NOTT.